(12) United States Patent
Hwang

(10) Patent No.: US 6,298,958 B1
(45) Date of Patent: Oct. 9, 2001

(54) AUTOMATICALLY ADJUSTABLE DAMPING FORCE SHOCK ABSORBER

(75) Inventor: Seong-Wook Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/466,055

(22) Filed: Dec. 17, 1999

(30) Foreign Application Priority Data

Sep. 21, 1999 (KR) .................................................. 99-40514

(51) Int. Cl.$^7$ ........................................................ F16F 9/50
(52) U.S. Cl. .................................. 188/266.7; 188/322.22; 188/266.2
(58) Field of Search ............................. 188/266.5, 266.7, 188/266.2, 322.22

(56) References Cited

U.S. PATENT DOCUMENTS

| | | | | |
|---|---|---|---|---|
| 4,729,459 | * | 3/1988 | Inagaki et al. | 188/299 |
| 4,781,477 | * | 11/1988 | Nagasawa | 400/124 |
| 4,828,220 | * | 5/1989 | Hashimoto | 251/129.06 |
| 5,029,677 | * | 7/1991 | Mitsui | 188/267 |
| 5,203,537 | * | 4/1993 | Jacobs et al. | 251/129.06 |
| 5,233,834 | * | 8/1993 | Tsukamoto | 60/545 |
| 5,303,804 | * | 4/1994 | Spiess | 188/319 |
| 5,409,089 | * | 4/1995 | Rapp et al. | 188/299 |
| 5,657,840 | * | 8/1997 | Lizell | 188/299 |
| 5,996,745 | * | 12/1999 | Jones, Jr. et al. | 188/266.7 |
| 6,003,644 | * | 12/1999 | Tanaka | 188/266.5 |
| 6,152,271 | * | 11/2000 | Achmad | 188/266.5 |

FOREIGN PATENT DOCUMENTS

2154700-A * 9/1995 (GB) .

* cited by examiner

Primary Examiner—Robert J. Oberleitner
Assistant Examiner—Melody M. Burch

(57) ABSTRACT

An automatically adjustable damping force shock absorber includes an outer cylinder; an inner cylinder provided in the outer cylinder; a piston inserted into the inner cylinder. The piston includes a plunger assembly slidably fitted in the inner cylinder so as to divide the inner cylinder into two compartments and provided with orifices on a side wall thereof, several one way valves on a upper and lower walls thereof and a cylindrical piston rod connected at one end thereof to the plunger assembly, a control valve provided in the plunger assembly for controlling fluid amount passing through the orifices and one way valves of the plunger assembly, and an electric power supplier connected to the control valve by a cable for supplying electric power. The electric power supplier includes an accelerometer for detecting extension and contraction of the shock absorber and responsively producing an acceleration level signal, an amplifier for amplifying the acceleration level signal, and a voltage generator for generating voltage on the basis of the acceleration signal.

1 Claim, 4 Drawing Sheets

AUTOMATICALLY ADJUSTABLE DAMPING FORCE SHOCK ABSORBER

BACKGROUND OF THE INVENTION (a) Field of the Invention

The present invention relates to a shock absorber of an automotive suspension system, and in particular, to a hydraulic shock absorber capable of controlling a damping force thereof.

(b) Description of the Related Art

Shock absorbers are mounted between a vehicle frame and a suspension, and operate on the principle of forcing fluid through restricted openings on both extension strokes and compression strokes.

In general, a hydraulic shock absorber includes a cylinder filled with hydraulic fluid and a piston inserted into the cylinder. The piston consists of a piston rod and a plunger assembly which is slidably fitted into the cylinder so as to divide the inside of the cylinder into two compartments. The plunger assembly is provided with a main orifice and a bypass orifice which provide communication between the two compartments in the cylinder, and the orifices have respective valve mechanisms for controlling the amount of fluid communication.

FIG. 5 shows a prior art shock absorber capable of adjusting damping force thereof. As shown in FIG. 5, the shock absorber comprises a cylinder 112 connected to a suspension (not shown) and a piston 114 inserted into the cylinder 112, with an end of piston 114 outside the cylinder 112 being connected to a vehicle body (not shown). The piston 114 includes a cylindrical piston rod 115 and rotary valve 124 slidably fitted in the cylinder 116. In a space inside the piston rod 115 with chamber 126, a step motor 122, gear mechanism 120, and clutch are located such that the rotary valve 124 receives rotary torque from the step motor 122 by way of a control rod 118 connecting the gear mechanism 120 to the clutch. Also, upper and lower chambers divided by the rotary valve 124 communicate through orifices 119 formed in a valve case, and the amount of fluid 128 passing through the orifices 119 can be adjusted by rotating a valve plate which varies the size of the orifices according to the amount of rotation of the step motor 122. Accordingly, the damping force of the shock absorber can be adjusted as needed.

However, since this shock absorber uses complicated mechanical structures such as a motor, gear mechanism, clutch, and so forth, there are difficulties in design, and it is impossible to precisely adjust the damping force.

Furthermore, the complicated mechanical structure delays response time of adjustments to the damping force on an uneven road.

SUMMARY OF THE INVENTION

The present invention has been made in an effort to solve the above problems of the prior art.

It is an object of the present invention to provide an improved shock absorber capable of precisely adjusting damping force thereof and promptly responding to road conditions.

To achieve the above object, an automatically adjustable damping force shock absorber of the present invention comprises an outer cylinder, an inner cylinder provided in the outer cylinder, and a piston inserted into the inner cylinder. The piston comprises a plunger assembly slidably fitted in the inner cylinder so as to divide the inner cylinder into two compartments, and provided with orifices on a side wall thereof and several one way valves on a upper and lower walls thereof. A cylindrical piston rod is connected at one end of the plunger assembly; a control valve is provided in the plunger assembly for controlling the amount of fluid through the orifices and one way valves of the plunger assembly; and an electric power supplier is connected to the control valve by a power supply cable. The electric power supplier comprises an accelerometer for detecting compression and extension of the shock absorber and responsively producing an acceleration level signal, an amplifier for amplifying the acceleration level signal, and a voltage generator for generating voltage on the basis of the acceleration signal.

BRIEF DESCRIPTION OF THE DRAWINGS

The accompanying drawings, which are incorporated in and constitute a part of the specification, serve to illustrate an embodiment of the invention, and, together with the description serve to explain the principles of the invention.

DETAILED DESCRIPTION OF THE PREFERRED EMBODIMENTS

A preferred embodiment of the present invention will be described hereinafter with reference to the accompanying drawings.

Figure 1:
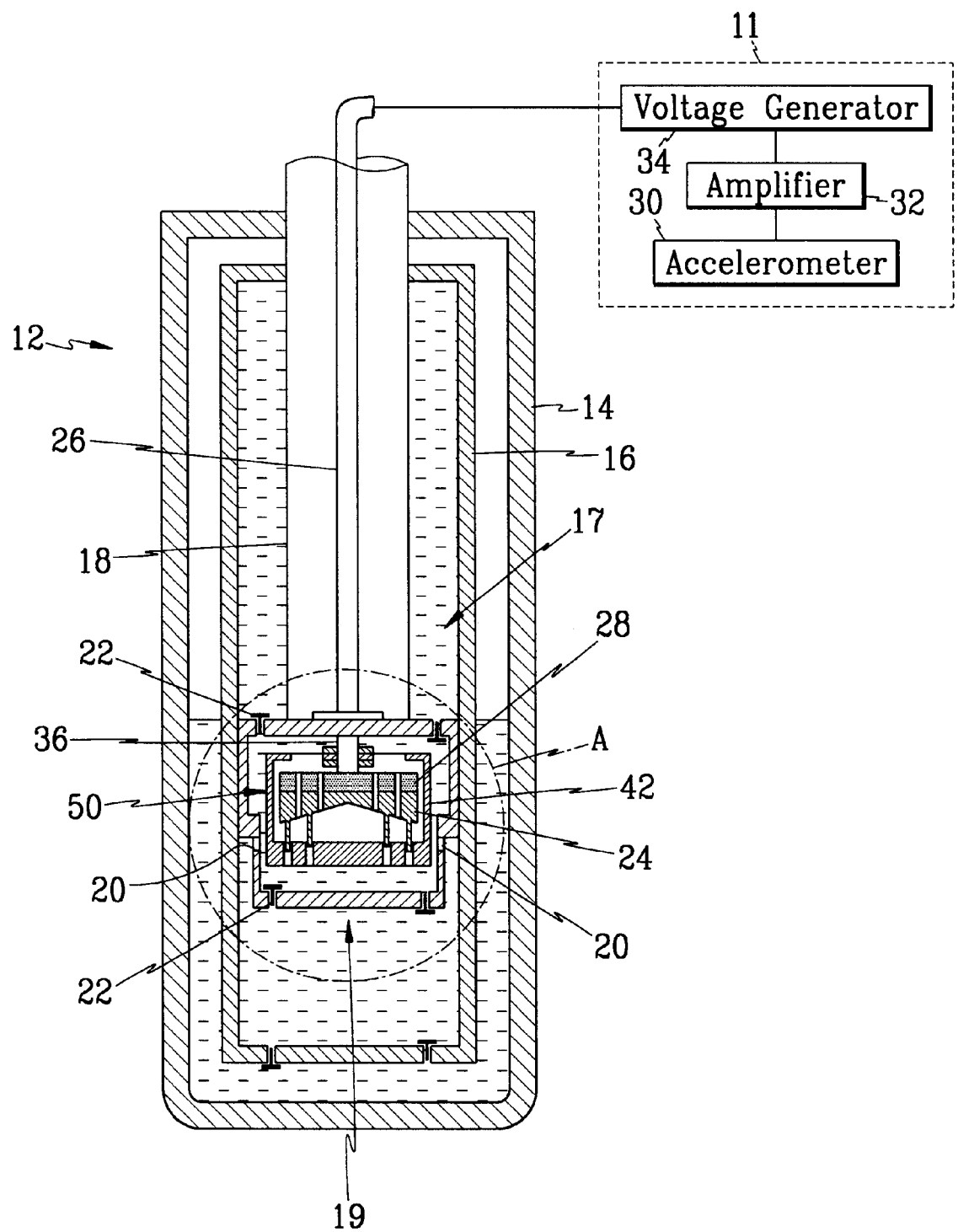
FIG. 1 is a schematic view of an automatically adjustable damping force shock absorbing according to a preferred embodiment of the present invention.
Figure 2:
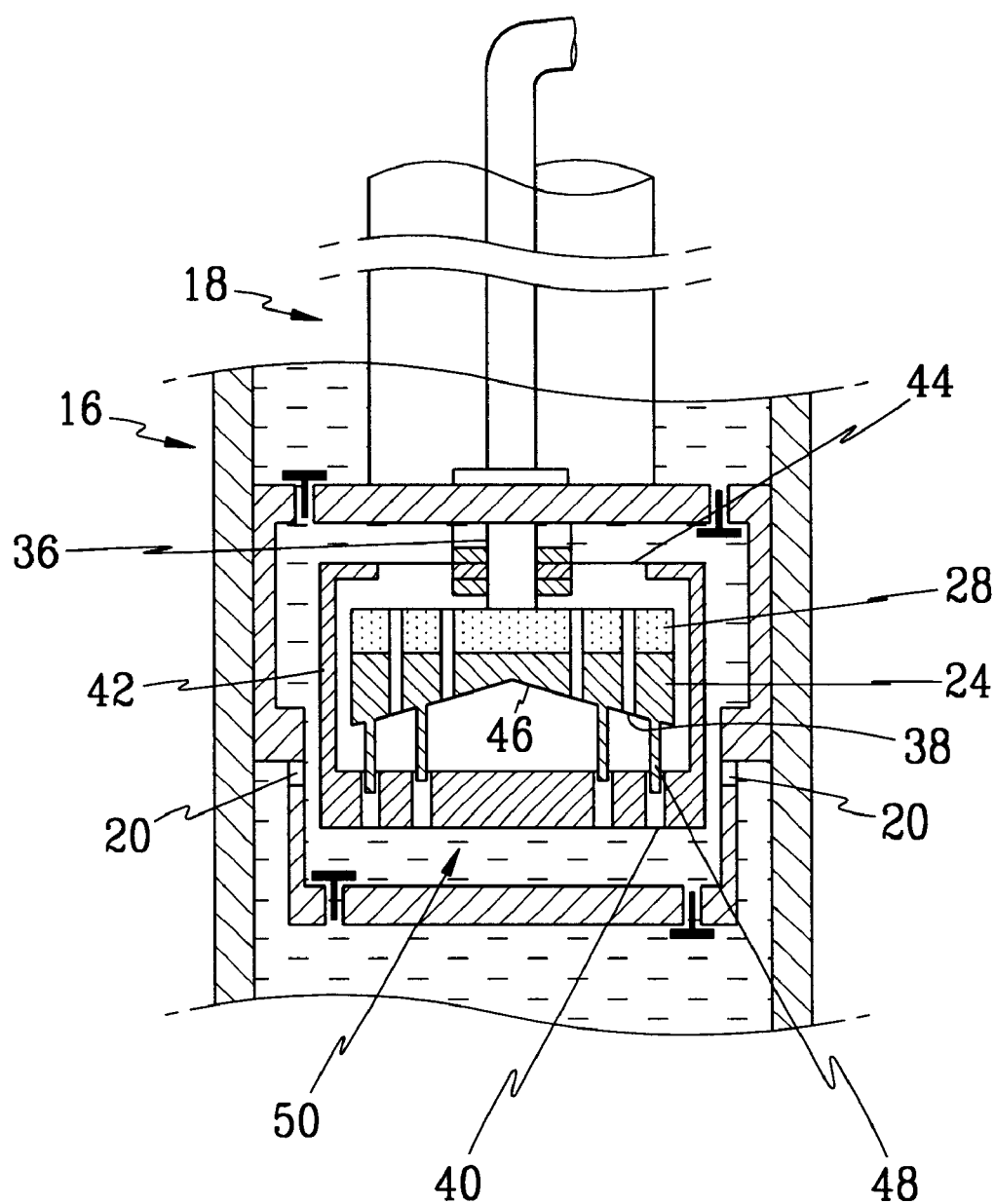
FIG. 2 is an enlarged view of portion A of FIG. 1.

FIG. 1 shows an automatically adjustable damping force shock absorber according to the preferred embodiment of the present invention, and FIG. 2 is an enlarged view of portion A of FIG. 1.

As shown in FIG. 1, the shock absorber 12 comprises an outer cylinder 14 and an inner cylinder 16 formed in the outer cylinder 14, with a predetermined space between the inner wall of the outer cylinder 14 and the outer wall of the inner cylinder 16. A piston 17 is inserted into the inner cylinder 16, and the inner cylinder 16 is full of oil.

The piston 17 includes a cylindrical piston rod 18 connected to an end of a plunger assembly 19 that is slidably fitted in the inner cylinder 16 so as to divide the inner cylinder into two compartments. The plunger assembly 19 is provided with orifices 20 formed on a side wall and several one-way valves 22 on upper and lower walls of the plunger assembly 19 such that fluid passes through the orifices 20 and the one way valves 22.

Also, the plunger assembly 19 (see FIG. 2) is provided with a control valve 50 inside thereof including a valve case 42 which is fixed to an upper wall of the plunger assembly 19 by a valve support 36 interposed between the upper wall of the plunger assembly 19 and a valve plate 24 which includes a piezoelectric member 28 fixed on an upper surface thereof. The valve case 42 is provided with an opening 44 at its upper wall and a plurality of passages 40 at its bottom wall such that the fluid can pass through the opening 44 and the passages 40. The valve plate 24 is conically concave on its bottom surface and a plurality of equal length column-like projections 48 are extended from the conically slanted surface 46 such that if the piezo-electric member 28 is expanded by receiving electric current, the projections 48 move down and are selectively inserted in the corresponding passages 40 formed in the bottom wall of the valve case 42 according to an expanded distance of the piezo-electric member 28.

The piezo-electric member 28 is powered by an electric power supplier 11 connected by a cable 26. The electric power supplier comprises an accelerometer 30 for detecting compression and expansion of the shock absorber and responsively producing an acceleration level signal, an amplifier 32 for amplifying the acceleration level signal, and a voltage generator 34 for generating a voltage on the basis of the acceleration level signal.

The operation of the automatically adjustable damping force absorber comprised as above will be described hereinafter with reference to FIG. 3 and FIG. 4.

Figure 3:
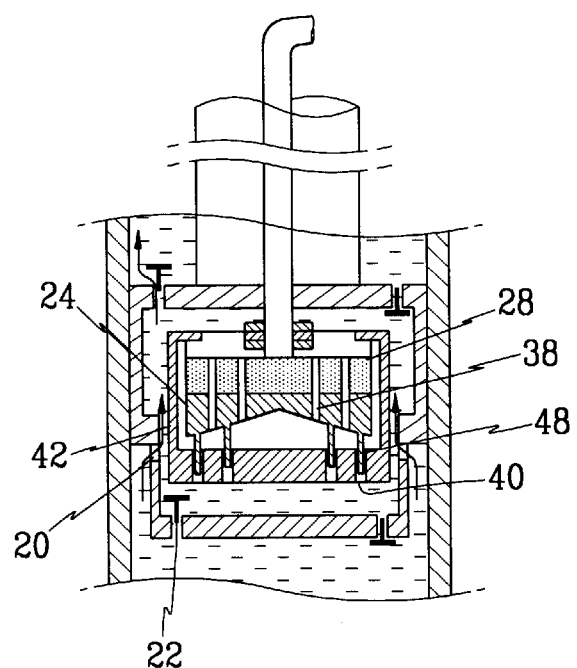
FIG. 3 illustrates an operation of the present automatically adjustable damping force shock absorber of FIG. 1 when the vehicle runs on an uneven road.

FIG. 3 illustrates an operation of the present automatically adjustable damping force shock absorber when the vehicle runs on uneven road.

When the vehicle runs on an uneven road, the accelerometer 30 detects compression and extension of the shock absorber and responsisvely produce an accelertion level signal. The acceleration level is amplified by an amplifier 32 and sent to the voltage generator 34 such that the voltage generator 34 generates a voltage according to the acceleration level signal. The piezo-electric member 28 is distorted according to the voltage such that the valve plate 24 is expanded towards the bottom wall of the valve case 42. According,the plurality of projection 48 are selectively inserted into the corresponding passages 40 fromedon the bottom wall of the valve case 42. This means that if the road surface gets more uneven, more passages 40 are closed, and oil flows amount decrement. As this happens, moreof the fuild flows through the orifices 20 formed in the side wall of the plunger assembly 19 such that the damping ability og the shock absorber 12 increases.

Figure 4:
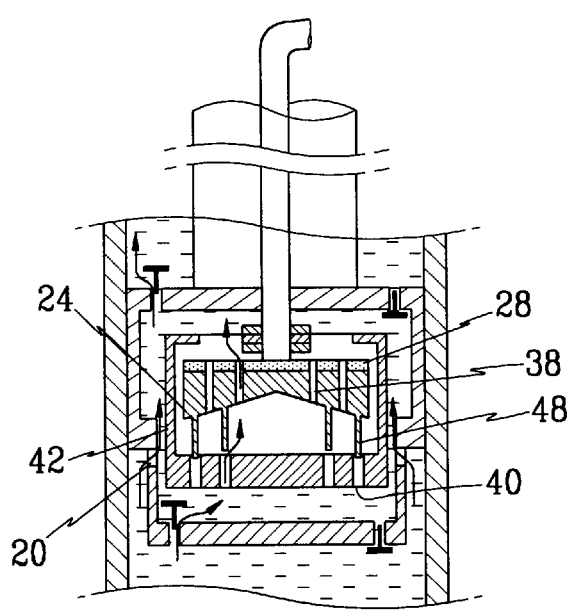
FIG. 4 illustrates an operation of the automatically adjustable damping force shock absorber of FIG. 1 when the vehicle runs on an uneven road.
Figure 5:
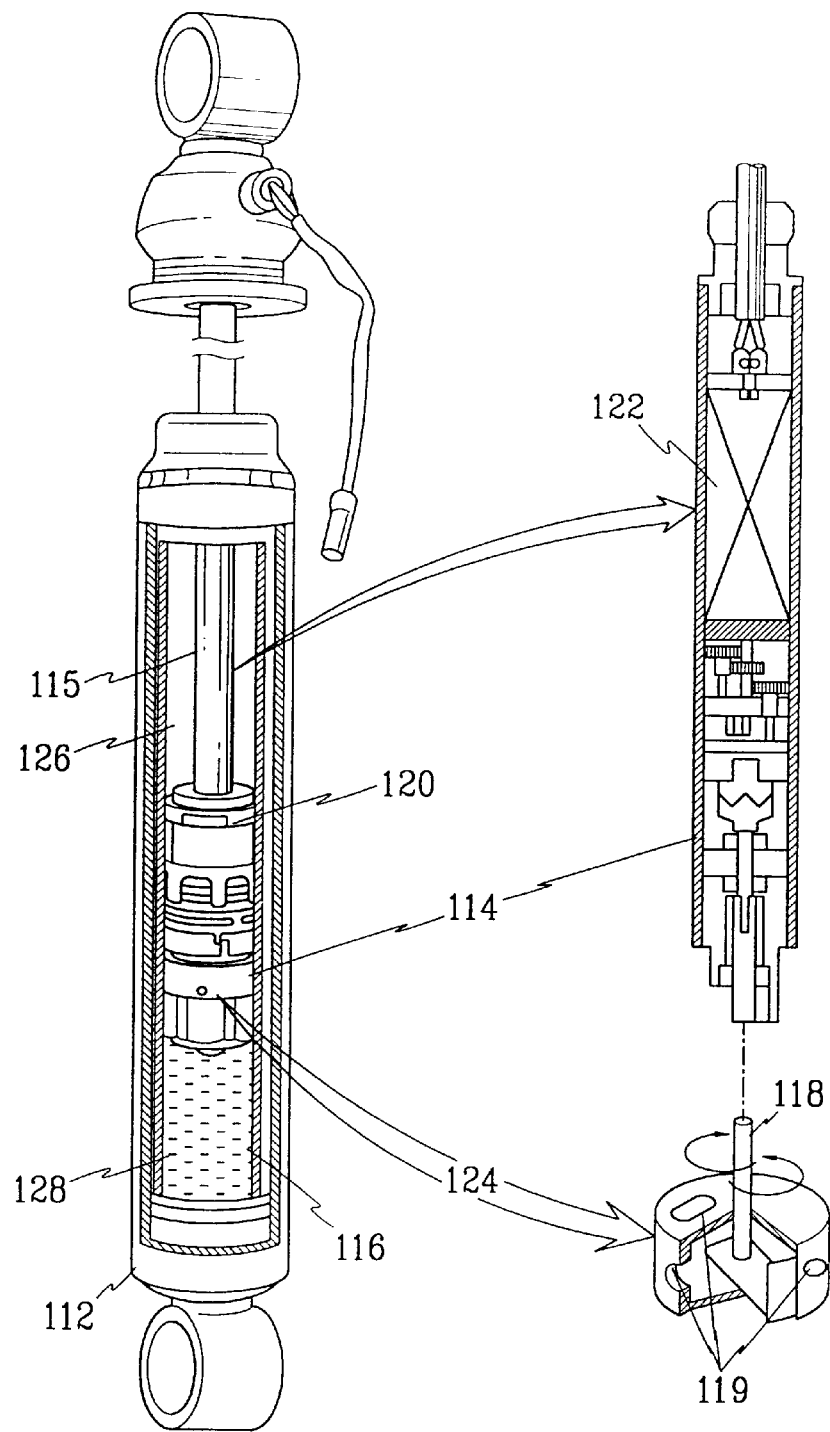
FIG. 5 shows a prior art shock absorber.

FIG. 4 illustrates an operation of the present automatically adjustable damping force shock absorber when the vehicle runs on relatively even road.

In this case, since the road is relatively even, the compression and expansion of the shock absorber is small such that the voltage generated by the voltage generator 34 is low. Accordingly, the piezo-electric member 28 is slightly distorted such that most passages 40 of the bottom wall of the valve case 42 are opened. As a result, the fluid flows through the orifices 20 formed on the side wall of the plunger assembly 19 and passages 40 such that the damping force of the shock absorber 12 decreases.

As described above, in the automatically adjustable damping force shock absorber of the present invention, the damping force is adjusted by controlling the amount of fluid passing through the one way valves using the control valve. Furthermore, since the control valve is actuated according to the voltage level generated by the voltage generator, which generates different voltage levels according to the road surface condition, the damping force control is performed promptly and reliably.

Also, in conjunction with an electronic control unit (ECU), various damping force control mechanisms for a shock absorber can be utilized.

Further, since the automatically adjustable damping force shock absorber of the present invention avoids using complicated mechanical structures such as a motor, gear mechanism, clutch, and so forth, it contributes to a reduction in weight of the vehicle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An automatically adjustable damping force shock absorber comprising:

an outer cylinder;

an inner cylinder provided in the outer cylinder;

a piston inserted into the inner cylinder;

wherein the piston comprises:

a plunger assembly slidably fitted in the inner cylinder so as to divide the inner cylinder into two compartments and provided with orifices on a side wall thereof and several one way valves on upper and lower walls thereof; and a cylindrical piston rod connected at one end thereof to the plunger assembly;

a control valve provided in the plunger assembly for controlling fluid amount passing through the orifices and one way valves of the plunger assembly, the control valve being a valve case having a plurality of passages on a bottom wall thereof and a valve plate provided with a piezo-electric member on an upper surface thereof, the valve plate being conically concave on a bottom wall thereof and a plurality of equal length cylindrical projections are extended from a conically slanted surface such that if the piezo-electric member is expanded by receiving electric power, the projections move down and are selectively inserted into the corresponding passages formed in the bottom wall of the valve case;

an electric power supplier connected to the control valve by a cable for supplying electric power, the electric power supplier including;

an accelerometer for detecting extension and compression of a shock absorber of a vehicle and responsively producing an acceleration level signal, an amplifier for amplifying the acceleration level signal; and a voltage generator for generating voltage on the basis of the acceleration level signal.

\* \* \* \* \*